United States Patent
Hayase et al.

(10) Patent No.: US 7,817,741 B2
(45) Date of Patent: Oct. 19, 2010

(54) MIMO WIRELESS DATA COMMUNICATION SYSTEM, MIMO WIRELESS DATA COMMUNICATION METHOD AND MIMO WIRELESS DATA COMMUNICATION APPARATUS

(75) Inventors: Shigenori Hayase, Kodaira (JP); Masaaki Shida, Hachioji (JP); Keisuke Yamamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 11/785,376

(22) Filed: Apr. 17, 2007

(65) Prior Publication Data

US 2007/0263745 A1 Nov. 15, 2007

(30) Foreign Application Priority Data

May 15, 2006 (JP) ............................. 2006-134691

(51) Int. Cl.
*H04B 7/01* (2006.01)
*H04L 1/02* (2006.01)

(52) U.S. Cl. .................. 375/267; 375/260; 375/299; 375/347; 370/334; 455/101

(58) Field of Classification Search ............... 375/267, 375/299, 347, 260; 455/101; 370/334
See application file for complete search history.

(56) References Cited

U.S. PATENT DOCUMENTS 6,888,809 B1   5/2005  Foschini et al.
7,346,115 B2 * 3/2008  Howard et al. ............. 375/260
7,418,053 B2 * 8/2008  Perlman et al. ............ 375/267
7,493,092 B2 * 2/2009  Shida et al. ................ 455/103
2005/0095996 A1 5/2005 Takano

FOREIGN PATENT DOCUMENTS

JP       2005-323217       5/2004

OTHER PUBLICATIONS

Yasuhiko Tanabe et al., "A Study on Transmit Method of MIMO-OFDM Considering Nonlinear Distortion", The Institute of Electronics, Information and Communication Engineers (IEICE), 2005 General Conference, p. 528 in Japanese, and pp. 1-5 English translation.

* cited by examiner

Primary Examiner—Ted M Wang
(74) Attorney, Agent, or Firm—Stites & Harbison PLLC; Juan Carlos A. Marquez, Esq.

(57) ABSTRACT

In a MIMO wireless communication system, the transformation process synthesizes the eigenmodes having a large singular value (i.e. a high effective SNR) and the eigenmodes having a small singular value (i.e. a low effective SNR). Thereby, the former eigenmodes are converted into modes having suppressed effective SNR which do not require a large number of levels of modulation, and the latter eigenmodes are converted into modes having increased effective SNR instead. In a MIMO wireless communication system for eigenmode transmission, a large communication capacity is realized without increasing the number of levels of modulation even in a communication environment capable of achieving a high SNR.

20 Claims, 10 Drawing Sheets

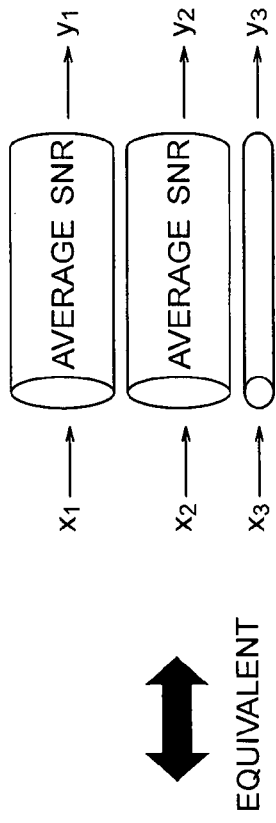
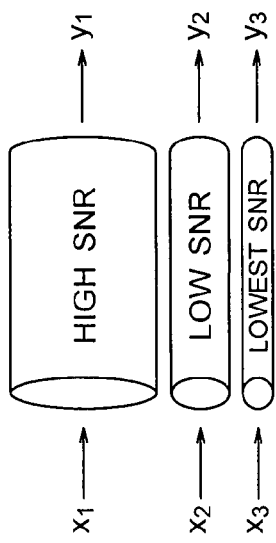
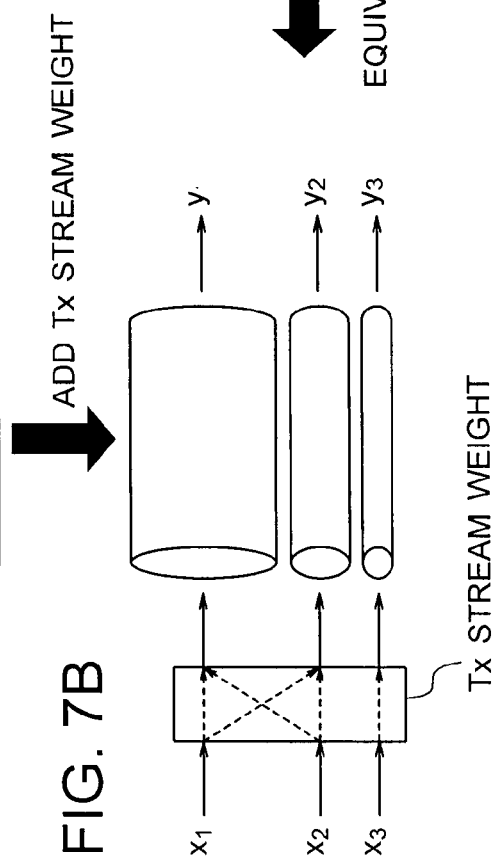

MIMO WIRELESS DATA COMMUNICATION SYSTEM, MIMO WIRELESS DATA COMMUNICATION METHOD AND MIMO WIRELESS DATA COMMUNICATION APPARATUS

CLAIM OF PRIORITY

The present application claims priority from Japanese application JP2006-134691 filed on May 15, 2006, the content of which is hereby incorporated by reference into this application.

BACKGROUND OF THE INVENTION

1. Field of the Invention

The present invention relates to a multiple-input multiple-output (MIMO) wireless communication method for communications between a sending or transmission terminal having a plurality of antennas and a receiving or reception terminal having a plurality of antennas and a MIMO wireless communication apparatus for communications by the MIMO wireless communication method. More particularly, the present invention relates to a MIMO wireless communication method and apparatus for communications at a high transmission rate if a signal-to-noise (SNR) ratio is high for an eigenmode transmission method which is one type of the MIMO communication method.

2. Description of the Related Art

A communication method has advanced toward a large capacity because of recent expansion of communication demands. This trend is remarkable also in wireless communications. For example, a communication capacity expands also in wireless LAN standards IEEE802.11 defined by Institute of Electrical and Electronics Engineers, Inc (IEEE) which standardizes Local Area Networks (LAN). A communication capacity was initially set to 2 Mbps in IEEE802.11, then expanded to a maximum of 11 Mbps in IEEE802.11b and a maximum of 54 Mbps in IEEE802.11a and 11g, and is expected to be set to a maximum of 600 Mbps in IEEE802.11n whose standardization will be completed in 2007.

MIMO technologies are adopted in IEEE802.11n and the like as an approach to realizing a large capacity of wireless communications. FIG. 2 is a schematic diagram showing a MIMO wireless communication system. A transmission terminal has N transmission antennas 202 and a reception terminal has N reception antennas 203. A transmission antenna signal vector t is defined by a formula (1) by representing signals transmitted from the transmission antennas 202-1 to 202-N by t1 to tN, respectively:

$$t = \begin{pmatrix} t_1 \\ \vdots \\ t_N \end{pmatrix} \quad (1)$$

Similarly, a reception antenna signal vector r is defined by a formula (2) by representing signals received at the reception antennas 203-1 to 203-N by r1 to rN, respectively:

$$r = \begin{pmatrix} r_1 \\ \vdots \\ r_N \end{pmatrix} \quad (2)$$

Transformation from t to r can be expressed by a linear transformation of a formula (3):

$$r = Ht \quad (3)$$

A matrix H representative of this linear transformation is called a channel matrix. Noises are generated at the same time in an actual case. Therefore, noise components n are added as in a formula (4):

$$r = Ht + n \quad (4)$$

The channel matrix can be estimated at the reception terminal by transmitting a known signal from the transmission terminal to the reception terminal. This is called channel matrix estimation, and the transmitted known signal is called a training signal. The channel matrix estimation is conducted before MIMO wireless communications are performed.

In FIG. 2, transmission data signals are represented by x1 to xN, reception data signals are represented by y1 to yN, a transmission data signal vector x is defined by a formula (5), and a reception data vector y is defined by a formula (6):

$$x = \begin{pmatrix} x_1 \\ \vdots \\ x_N \end{pmatrix} \quad (5)$$

$$y = \begin{pmatrix} y_1 \\ \vdots \\ y_N \end{pmatrix} \quad (6)$$

A transmission antenna weight unit 201 in the transmission terminal transforms x into t by linear transformation. A reception antenna weight unit 204 in the reception terminal transforms r into y by linear transformation. The simplest method of realizing MIMO wireless communications is a zero-forcing (ZF) method of using a transmission antenna weight as a unit matrix and a reception antenna weight as an inverse matrix of H. According to the ZF method, a relation between x and y is expressed by a formula (7):

$$\begin{aligned} y &= H^{-1} r \\ &= H^{-1}(Ht + n) \\ &= t + H^{-1} n \\ &= x + H^{-1} n \end{aligned} \quad (7)$$

By cancelling H by its inverse matrix, it becomes possible to recover the transmission data signal at the reception terminal. However, noises are amplified by the inverse matrix of H.

Apart from the ZF method, there is a method called an eigenmode transmission method of realizing MIMO wireless communications. First, this method performs singular value decomposition (SVD) of H expressed by a formula (8):

$$H = USV^H \quad (8)$$

S is a diagonal matrix whose all elements are positive real numbers, and U and V are unitary matrices. A superscript H of V means Hermitian conjugate (=transpose+complex conjugate). Diagonal elements of S are called singular values. It is assumed that elements of S are called a first singular value, a second singular value, . . . starting from the upper left element, and arranged in the order of larger singular values. The transmission antenna weight is represented by V and the reception antenna weight is represented by Hermitian conjugate of U. A relation between x and y in the eigenmode transmission method is expressed by a formula (9):

$$y = U^H r \qquad (9)$$
$$= U^H (Ht + n)$$
$$= U^H (USV^H \cdot Vx + n)$$
$$= Sx + U^H n$$

This utilizes the property that Hermitian conjugate of a unitary matrix is equal to the inverse matrix. A signal multiplying the transmission data signal by the singular value is obtained separately from the reception data signal when considering that the amplitude of noises n at the last term in the formula (9) does not change at all because of the property of the unitary matrix and that S is the diagonal matrix. Data communications from x1 to y1 are called a first eigenmode, and sequentially thereafter data communications are called a second eigenmode, a third eigenmode, . . . . In each eigenmode, a transmission gain (loss if smaller than 1) of a square of the singular value is obtained. It is commonly known that the eigenmode transmission method is the MIMO wireless communication method capable of realizing the largest communication capacity.

However, as different from the ZF method, the eigenmode transmission method is required to set the transmission antenna weight to the matrix calculated from H. Further, since H is estimated at the reception terminal, it is necessary for the reception terminal to feed back information on H to the transmission terminal. Therefore, information is required to be transferred as shown in FIG. 3. It is to be noted that both the transmission and reception terminals have a transmission and reception function. First, the transmission terminal transmits training data, and the reception terminal receives it and estimates the channel matrix. The channel matrix is returned to the transmission terminal which in turn determines the transmission antenna weight from SVD of the channel matrix. Next, after executing a transmission antenna weight process, the transmission terminal transmits a training signal, and the reception terminal estimates again the channel matrix from the received training signal to determine the reception antenna weight. Thereafter, the transmission terminal transmits a transmission data signal subjected to the transmission antenna weight process, and the reception terminal recovers data by the reception antenna weight to thereby establish data communications. Although the transmission terminal determines the transmission antenna weight by SVD as shown in FIG. 3, the transmission antenna weight may be determined at the reception terminal as shown in FIG. 4. In this case, the transmission antenna weight is fed back.

In FIGS. 3 and 4, first SVD does not determine the reception antenna weight, but the reception antenna weight is separately determined by obtaining the channel matrix by using the training signal subjected to the transmission antenna weight process. A channel matrix H' to be estimated in this case is expressed by a formula (10):

$$H' = HV \qquad (10)$$
$$= USV^H \cdot V$$
$$= US$$

If the ZF method is used for determining the reception antenna weight, a reception antenna weight R is expressed by a formula (11):

$$R = H'^{-1} \qquad (11)$$
$$= (US)^{-1}$$
$$= S^{-1} U^H$$

Therefore, a relation between x and y can be expressed by a formula (12):

$$y = S^{-1} U^H r \qquad (12)$$
$$= S^{-1} U^H (Ht + n)$$
$$= S^{-1} U^H (USV^H \cdot Vx + n)$$
$$= x + S^{-1} U^H n$$

Namely, in an n-th eigenmode, an amplitude of noises change with an inverse of an n-th singular value, and SNR changes in proportion to a square of a singular value. It is widely known that there are also a minimum mean square error (MMSE) method and a maximum likelihood detection (MLD) method, as the method of determining the reception antenna weight.

The reasons why the method described above is used are as follows. The first reason is to deal with a temporal change of the channel matrix. Even if the channel matrix has changed prior to data transmission, it is possible to set the reception antenna weight matching the current channel matrix so that reception characteristics can be prevented from being degraded. The second reason is that feedback information can be made less. In orthogonal frequency division multiplexing (OFDM) communications such as those used in wireless LAN, it is necessary to set the transmission antenna weight for each subcarrier so that the amount of feedback information is very large. Since the feedback information is properly thinned from this reason, there may exist a large difference between the transmission antenna weight and the weight obtained through SVD of the channel matrix. However, since the reception antennal weight is set by considering the influence of the actually used transmission antenna weight, the characteristics can be prevented from being degraded.

FIG. 6 shows a probability distribution of a transmission (path) gain calculated from a square of a singular value. It is assumed that four transmission antennas and four reception antennas are used and each element of the channel matrix is an independent probability variable (Rayleigh fading) in conformity with the Rayleigh distribution. A transmission loss from each transmission antenna to each reception antenna is set to 0 dB. For reference, single-input single-output (SISO) with one transmission antenna and one reception antenna is also shown. SISO has an average transmission gain of 0 dB as the assumed condition shows. In contrast, in MIMO the fourth eigenmode has an average transmission loss of 8 dB, whereas the first eigenmode has an average transmission gain of about 10 dB. Therefore, for example, in a communication environment capable of obtaining a communication SNR of 30 dB, the first eigenmode can achieve an effective SNR of 40 dB. Therefore, in order to effectively utilize the first eigenmode, it is important to adopt modulation of a large number of levels and transmit a large amount of information.

However, for modulation of a large number of levels, a radio frequency (RF) circuit is required to have a high precision. Factors degrading a precision of an RF circuit include IQ mismatch, power amplifier non-linearity and the like. At a precision of a circuit currently used in wireless LAN, a limit of modulation is up to 64 QAM modulation, and 256 QAM modulation or higher is very difficult. Therefore, IEEE802.11a and 11g adopt only four schema BPSK, WPSK, 16 QAM and 64 QAM and cannot adopt 256 QAM. Even IEEE802.11n incorporating MIMO has a policy of not using 256 QAM. Therefore, even if a high SNR can be achieved, the number of levels of modulation cannot be made large, not leading to expansion of a communication capacity.

A method of solving this problem is proposed in JP-A-2005-323217 and "Studies on transmission method considering non-linear strain in MIMO-OFDM" by Yasuhiro TANABE, Hiroki SHOUGI, Hirofumi TSURUMI, 2005, The Institute of Electronics, Information and Communication Engineers, Composite Meetings, B-5-79. With this method, in a MIMO-OFDM wireless communication system for eigenmode transmission, the same modulation level is used for all subcarriers and all eigenmodes, and outputs of an error-correcting coder are sequentially assigned to different subcarriers. During this assignment, the eigenmode is changed for each subcarrier. With this method, the modulation number of levels of modulation becomes too large relative to the singular value in the eigenmode having a small singular value so that errors occur frequently. Conversely in the eigenmode having a large singular value, the number of levels of modulation is small relative to the singular value so that errors are hard to occur. Therefore, the error-correcting process corrects errors occurred in the eigenmode having a small singular value, and communications with a large communication capacity is possible.

SUMMARY OF THE INVENTION

The present invention realizes a large communication capacity without increasing the number of levels of modulation even in a communication environment capable of achieving a high SNR, in a MIMO wireless communication system for eigenmode transmission.

As described above, a method of solving this problem is proposed in JP-A-2005-323217 and "Studies on transmission method considering non-linear strain in MIMO-OFDM". However, this method deals with only multicarrier transmission such as OFDM. Further, this method cannot solve the problem that the number of levels of modulation cannot be made large in the first eigenmode which inherently obtains a high effective SNR.

In the MIMO wireless communication system of the present invention, after singular values and a transmission antenna weight are determined by singular value decomposition of a channel matrix, a transmission stream weight is calculated. When data is to be transmitted, a transformation process using the calculated transmission stream weight is executed immediately before a transmission antenna weight process. This transformation process synthesizes the eigenmodes having a large singular value (i.e. a high effective SNR) and the eigenmodes having a small singular value (i.e. a low effective SNR). Thereby, the former eigenmodes are converted into modes having suppressed effective SNR which do not require a large number of levels of modulation, and the latter eigenmodes are converted into modes having increased effective SNR instead.

FIGS. 7A to 7C are schematic diagrams illustrating mode transformation by the transmission stream weight. In these drawings, it is assumed that three transmission antennas and three reception antennas are used. FIG. 7A illustrates three eigenmodes obtained in conventional eigenmode transmission. An effective SNR is represented by a pipe thickness. x1 to x3 are three transmission data signals, and y1 to y3 are three reception data signals. In this case, it is assumed that an SNR in the eigenmode of communications from x1 to y1 is high and the state is that an optimum number of levels of modulation cannot be selected. In this case, the transmission stream weight synthesizes the first eigenmode and the second eigenmode. FIG. 7B shows the state that the transmission stream weight is adopted. Since x1 and x2 are transmitted by using both the first and second eigenmodes, the effective SNR of both the signals is an intermediate value of the first eigenmode SNR and second eigenmode SNR as shown in FIG. 7C. Since too high an SNR state is improved, communications become possible by selecting an optimum number of levels of modulation and a communication capacity can be expanded. Although it is necessary to adopt the reception antenna weight as well as the reception stream weight as the transmission stream weight is adopted, this can be dealt with by estimating the channel matrix from the training signal after the transmission stream weight is adopted, and determining the reception antenna weight from the estimated channel matrix.

If SNR is high not only in the first eigenmode but also in the second and succeeding eigenmodes, three or more eigenmodes are synthesized in the order of larger singular values.

It is necessary to conserve a total transmission power between and after adopting the transmission stream weight and to maintain independence between transmission data signals. It is therefore necessary that the transmission stream weight is a unitary matrix. It is easy and simple to adopt W expressed by a formula (13) as the transmission stream weight when the first to n-th eigenmodes are to be synthesized.

$$W = (w_0 \quad w_1 \quad \ldots \quad w_{n-1}) \tag{13}$$

$$w_i = \frac{1}{\sqrt{n}} \begin{pmatrix} \exp\left(j2\pi \frac{0}{n} i\right) \\ \exp\left(j2\pi \frac{1}{n} i\right) \\ \vdots \\ \exp\left(j2\pi \frac{n-1}{n} i\right) \end{pmatrix}$$

All elements of Ws have the same absolute value so that all eigenmodes can be synthesized at the equal weight.

In determining the number of eigenmodes to be synthesized, all eigenmodes having a communication quality indicator larger than a preset value and the eigenmode having the largest singular value among the remaining eigenmodes are adopted. An effective SNR can be used as the communication quality indicator. If SNR is determined, the communication capacity can be calculated, and the number of levels of modulation and coding rate necessary for achieving the communication capacity can be determined. Therefore, the preset value to be used for judgement of eigenmode synthesis can be determined by calculating the corresponding SNR from the largest number of levels of modulation and coding level capable of being adopted in the actual communication system. Similarly, a received signal strength indicator (RSSI) may be used as the communication quality indicator.

According to the present invention, in the MIMO wireless communication system for eigenmode transmission, a communication capacity can be expanded by relaxing a limit in an upper number of levels of modulation, even in a high SNR communication environment.

FIG. 8 is a graph showing a Shannon' communication capacity when the present invention is applied to the case in which the number of transmission/reception antennas is 4, an upper limit in levels of modulation is 64 QAM and an error-correcting code coding rate is ¾. Transmission was assumed in conformity with non-correlation Rayleigh fading. In addition to the present invention method, a zero forcing method and a conventional eigenmode transmission method are also shown. It can be seen from this graph that the present invention method can achieve the largest communication capacity. At an average SNR=25 dB, the communication capacity can be improved by 2.5 dB as compared to the conventional eigenmode transmission method.

BRIEF DESCRIPTION OF THE DRAWINGS

FIGS. 7A to 7C are schematic diagrams illustrating synthesis of eigenmodes in a wireless communication method of the present indention.

DESCRIPTION OF THE EMBODIMENT

Embodiments of the present invention will now be described.

First Embodiment

Figure 1:
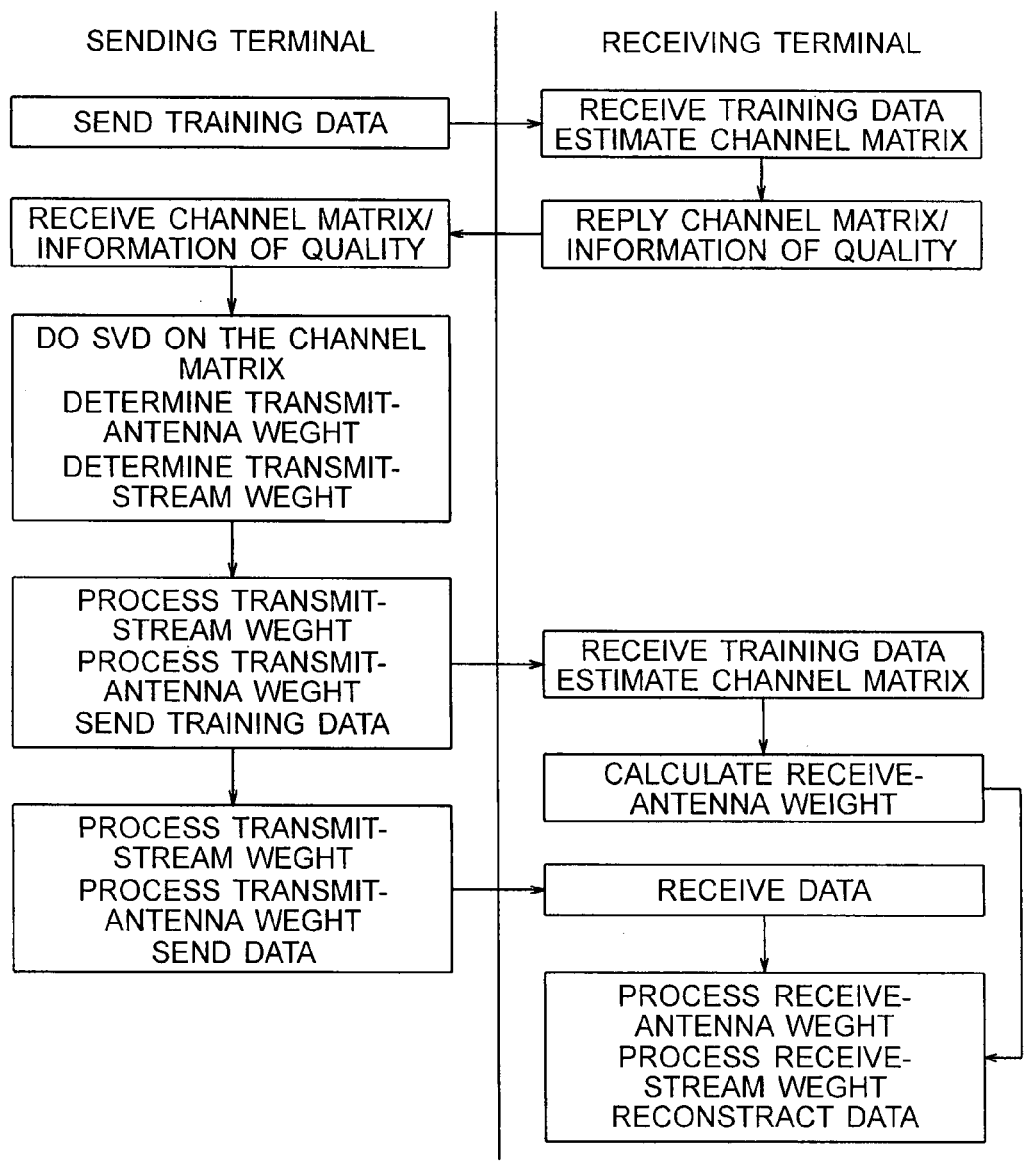
FIG. 1 is a diagram showing a sequence of wireless communications of the present invention.
Figure 2:
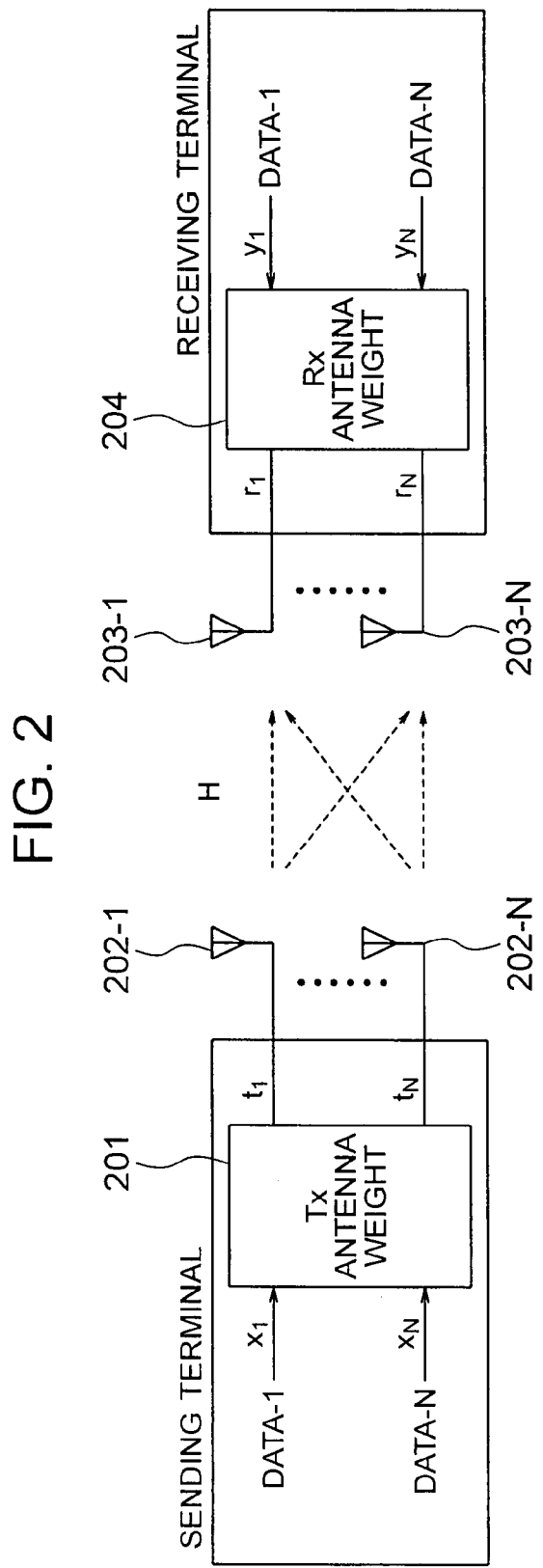
FIG. 2 is a schematic diagram illustrating a MIMO wireless communication method.
Figure 3:
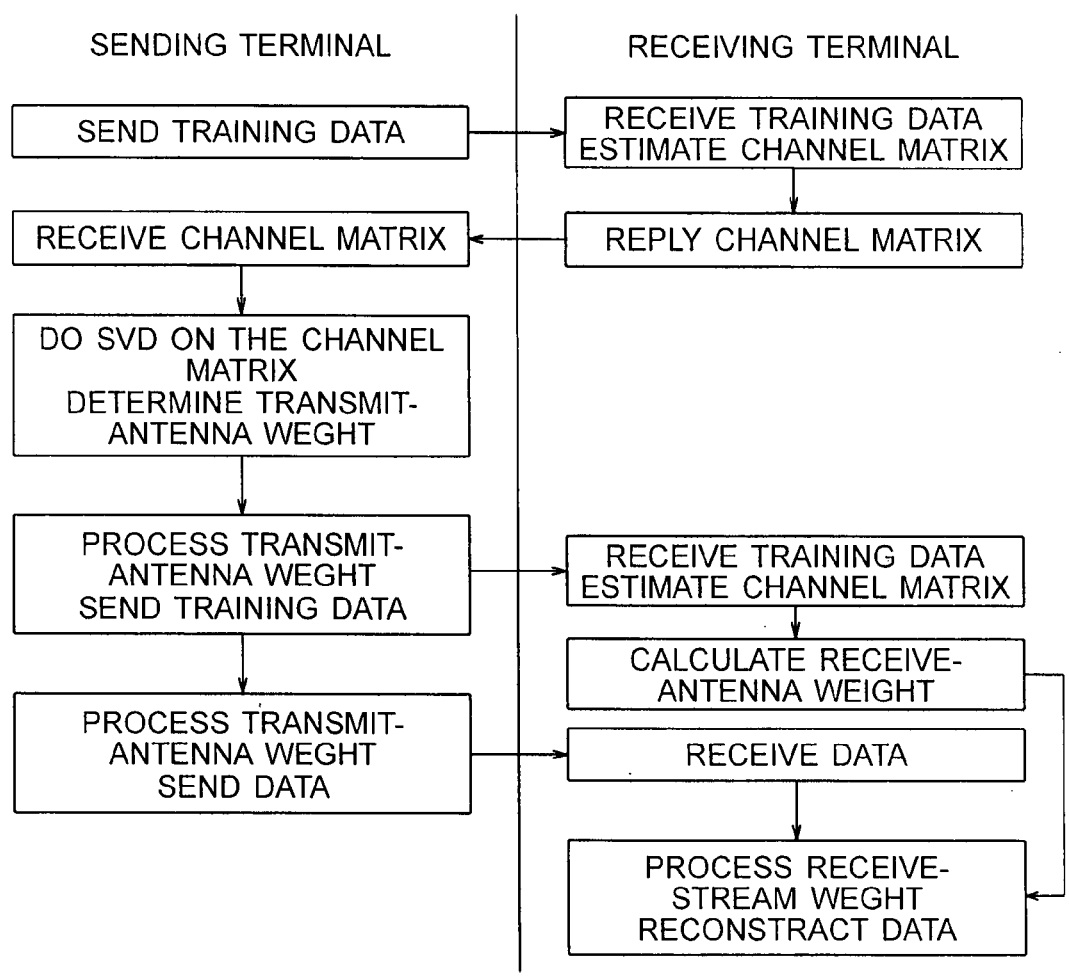
FIG. 3 is a diagram showing a sequence of communications by a conventional eigenmode transmission MIMO communication method.
Figure 4:
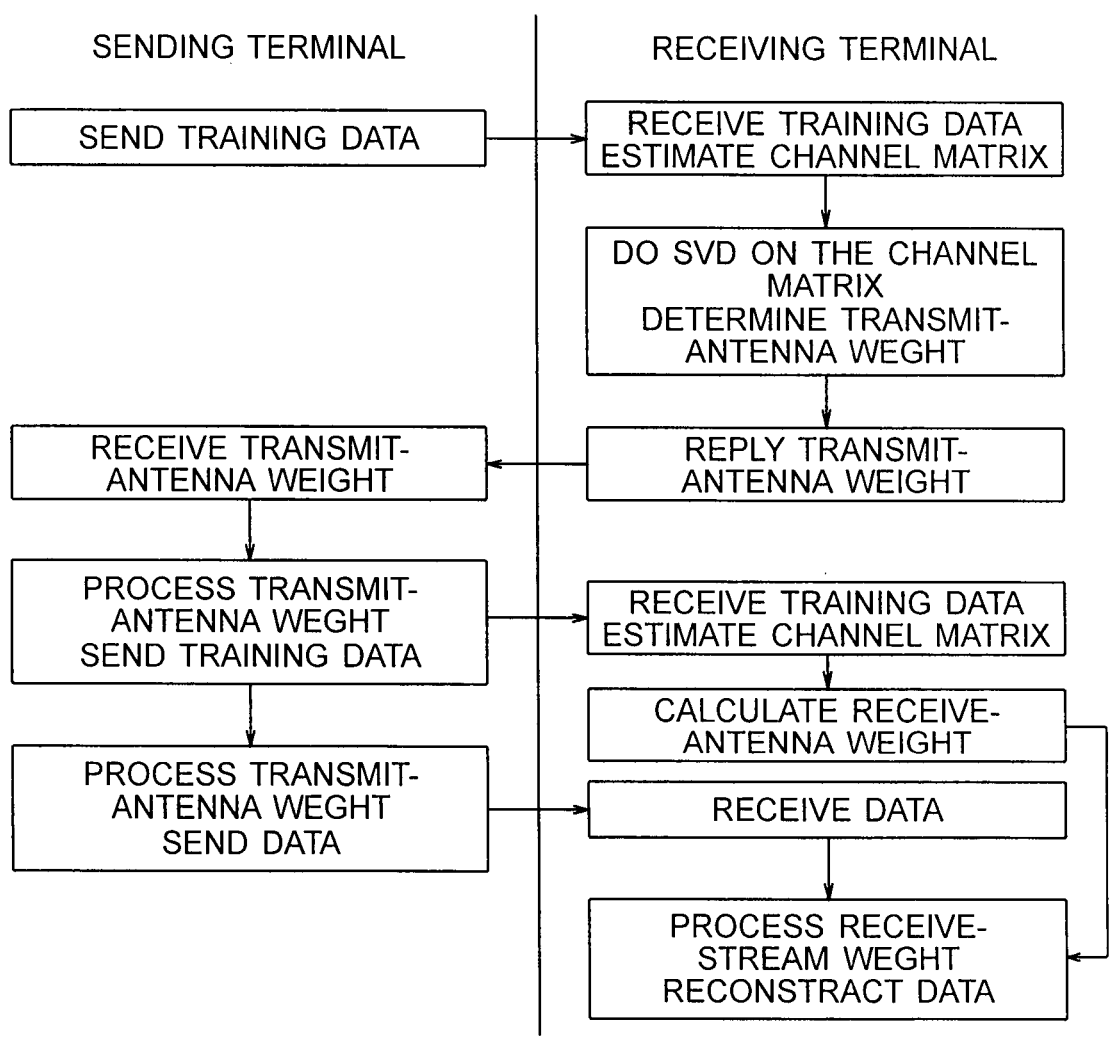
FIG. 4 is a diagram showing a sequence of communications by a conventional eigenmode transmission MIMO communication method.

FIG. 1 shows a sequence of a MIMO wireless communication method according to the first embodiment of the present invention. In FIG. 1, although data is transmitted from a transmission terminal to a reception terminal, both the terminals have the function of both transmission and reception so that control information and the like can be transferred therebetween.

First, the transmission terminal transmits training data, and the reception terminal receives the training data. Training data is already known signals defined by specifications or the like, and the channel matrix can be estimated by monitoring a change in the amplitude and phase of the known signals. Next, the reception terminal returns the channel matrix obtained through estimation and communication quality information to the transmission terminal. SNR or RSSI may be used as the communication quality information. The transmission terminal receives the returned channel matrix and communication quality information. The received channel matrix is subjected to singular value decomposition to obtain the transmission antenna weight for the eigenmode transmission method and singular values of each eigenmode. A communication quality indicator of each eigenmode is calculated from the obtained singular values and received communication quality indicator to determine each eigenmode to be synthesized by using the communication quality indicator. An effective SNR or RSSI of each eigenmode may be used as the communication quality indicator of each eigenmode. For eigenmodes to be synthesized, eigenmodes exceeding a preset reference effective SNR or RSSI and the eigenmode having the largest singular value among the remaining eigenmodes are synthesized. Next, a transmission stream weight for synthesizing the determined eigenmodes is determined. As an easy and simple approach, the transmission stream weight is calculated by the formula (13). Thereafter, training data subjected to transmission stream weight and transmission antenna weight processes are transmitted.

The reception terminal received the training data estimates a channel matrix. By using this channel matrix, the reception antenna weight is calculated. For calculating the reception antenna weight, the zero forming method, MMSE method, MLD method or the like may be used. The estimated channel matrix contains transformation of the transmission stream weight and transmission antenna weight. Therefore, by using the calculated reception antenna weight, the transmission data signal can be recovered by cancelling out the transformation. Lastly, the transmission terminal transmits a transmission data signal subjected to transmission stream weight and transmission antenna weight processes. The reception terminal can recover the data signal by using the reception antenna weight. With the procedure described above, communications can be established between the transmission and reception terminals.

Second Embodiment

Figure 5:
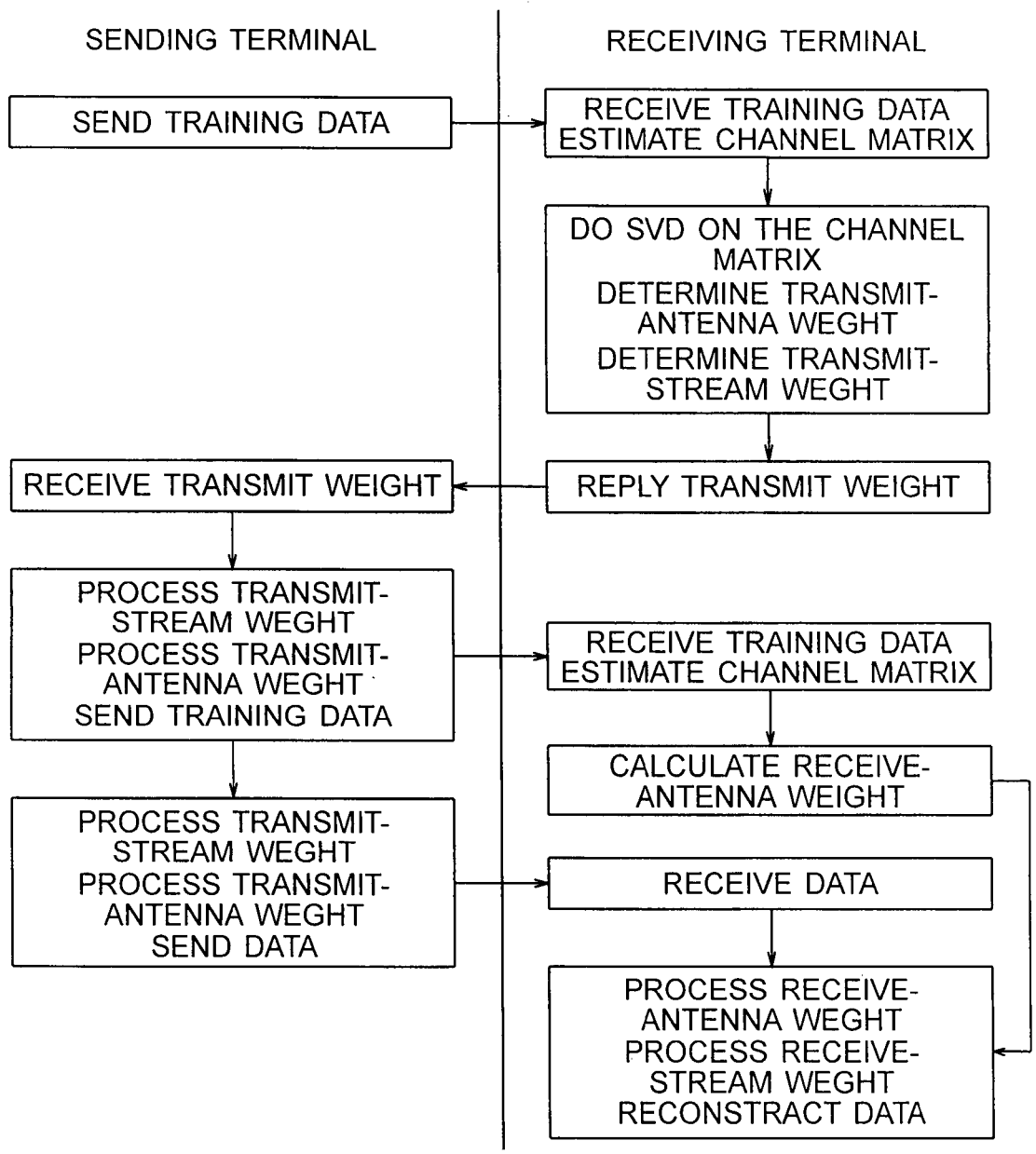
FIG. 5 is a diagram showing a sequence of wireless communications of the present invention.
Figure 6:
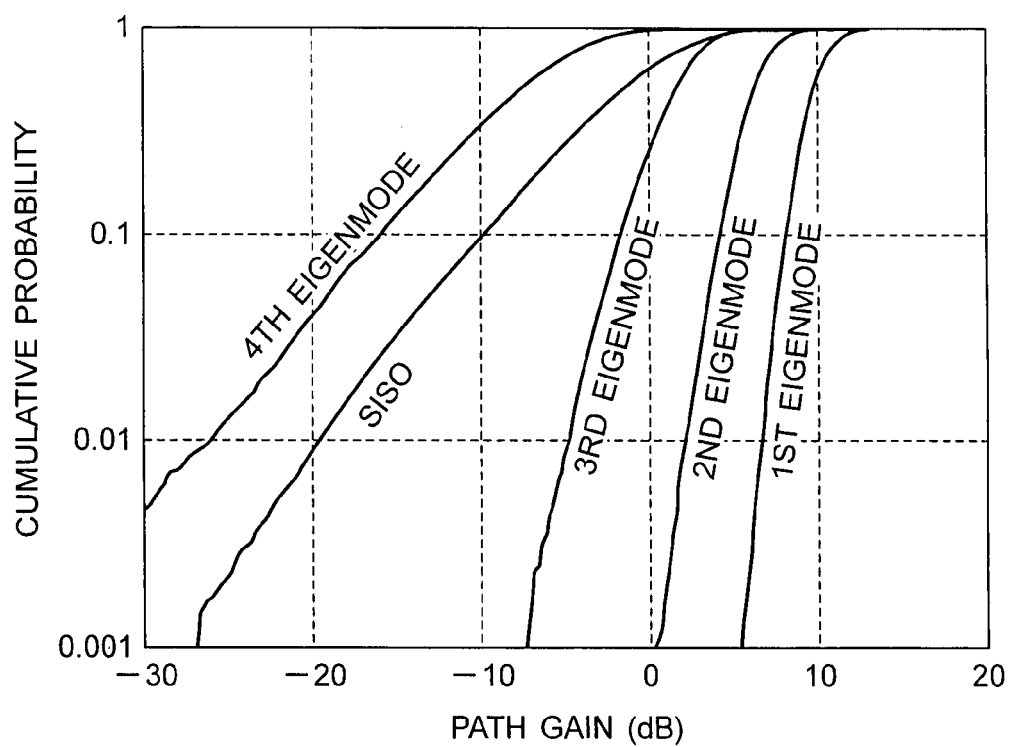
FIG. 6 is a graph showing a probability distribution of transmission gains of eigenmode MIMO communications with four transmission antennas and four reception antennas.
Figure 8:
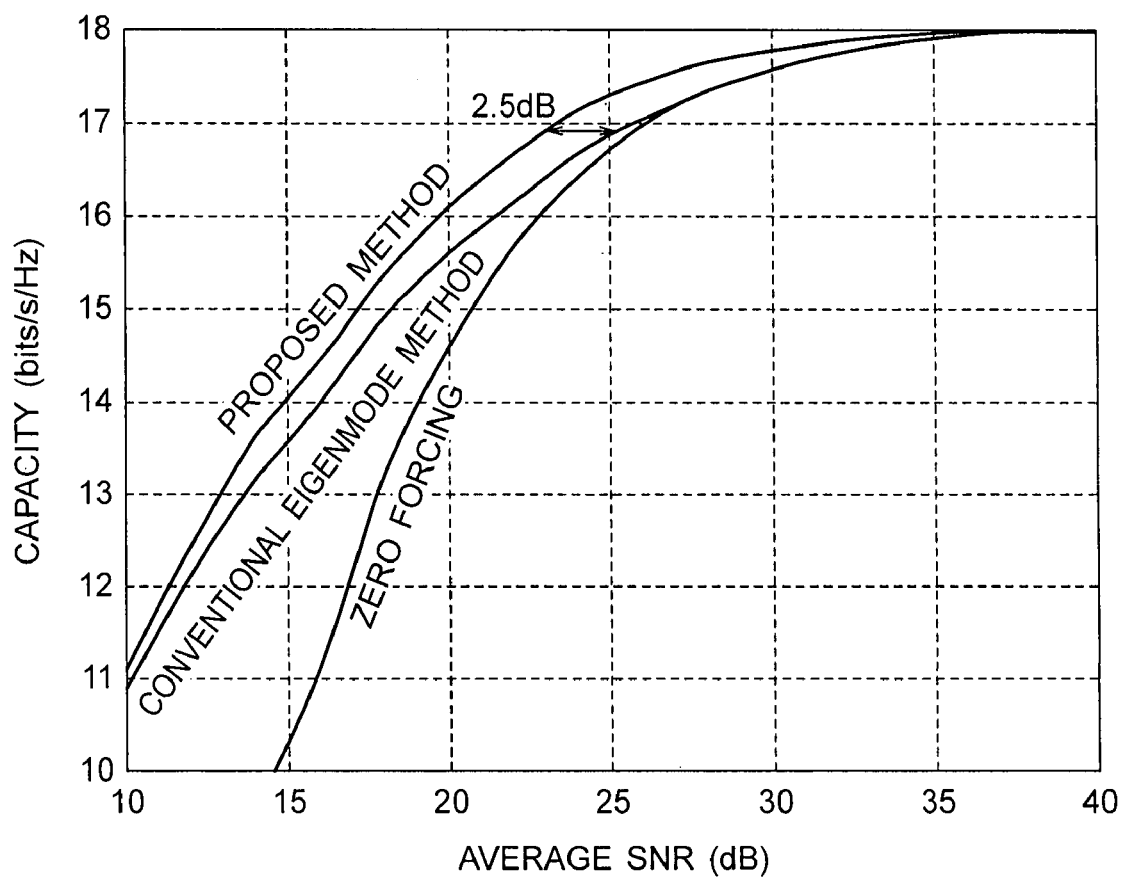
FIG. 8 is a graph showing a relation between a communication capacity and an average SNR.

FIG. 5 shows a sequence of a MIMO wireless communication method according to the second embodiment of the present invention. Similar to the first embodiment, in FIG. 5, although data is transmitted from a transmission terminal to a reception terminal, both the terminals have the function of both transmission and reception so that control information and the like can be transferred therebetween.

First, the transmission terminal transmits training data, and the reception terminal receives the training data. Training data is already known signals defined by specifications or the like, and the channel matrix can be estimated by monitoring a change in the amplitude and phase of the known signals. Next, the reception terminal makes the channel matrix obtained through estimation be subjected to singular value decomposition to obtain the transmission antenna weight for the eigenmode transmission method and singular values of each eigenmode. A communication quality indicator of each eigenmode is calculated from the obtained singular values and communication quality indicator to determine each eigenmode to be synthesized by using the communication quality indicator. An effective SNR or RSSI of each eigenmode may be used as the communication quality indicator of each eigenmode. For eigenmodes to be synthesized, eigenmodes exceeding a preset reference effective SNR or RSSI and the eigenmode having the largest singular value among the remaining eigenmodes are synthesized. Next, a transmission stream weight for synthesizing the determined eigenmodes is determined. As an easy and simple approach, the transmission stream weight is calculated by the formula (13). The determined transmission stream weight and transmission antenna weight are returned to the transmission terminal. Since the transmission stream weight and transmission antenna weight can be synthesized by a matrix product, the synthesized transmission weight is returned to reduce the amount of information to be returned.

The transmission terminal receives the synthesized transmission weight and transmits training data subjected to the transmission weight process. The reception terminal receives the training data and estimates a channel matrix. By using this channel matrix, the reception antenna weight is calculated. For calculating the reception antenna weight, the zero forming method, MMSE method, MLD method or the like may be used. The estimated channel matrix contains transformation of the transmission weight. Therefore, by using the calculated reception antenna weight, the transmission data signal can be recovered by cancelling out the transformation. Lastly, the transmission terminal transmits a transmission data signal subjected to the transmission weight process, and the reception terminal can recover the data signal by using the reception antenna weight. With the procedure described above, communications can be established between the transmission and reception terminals.

Third Embodiment

Figure 9:
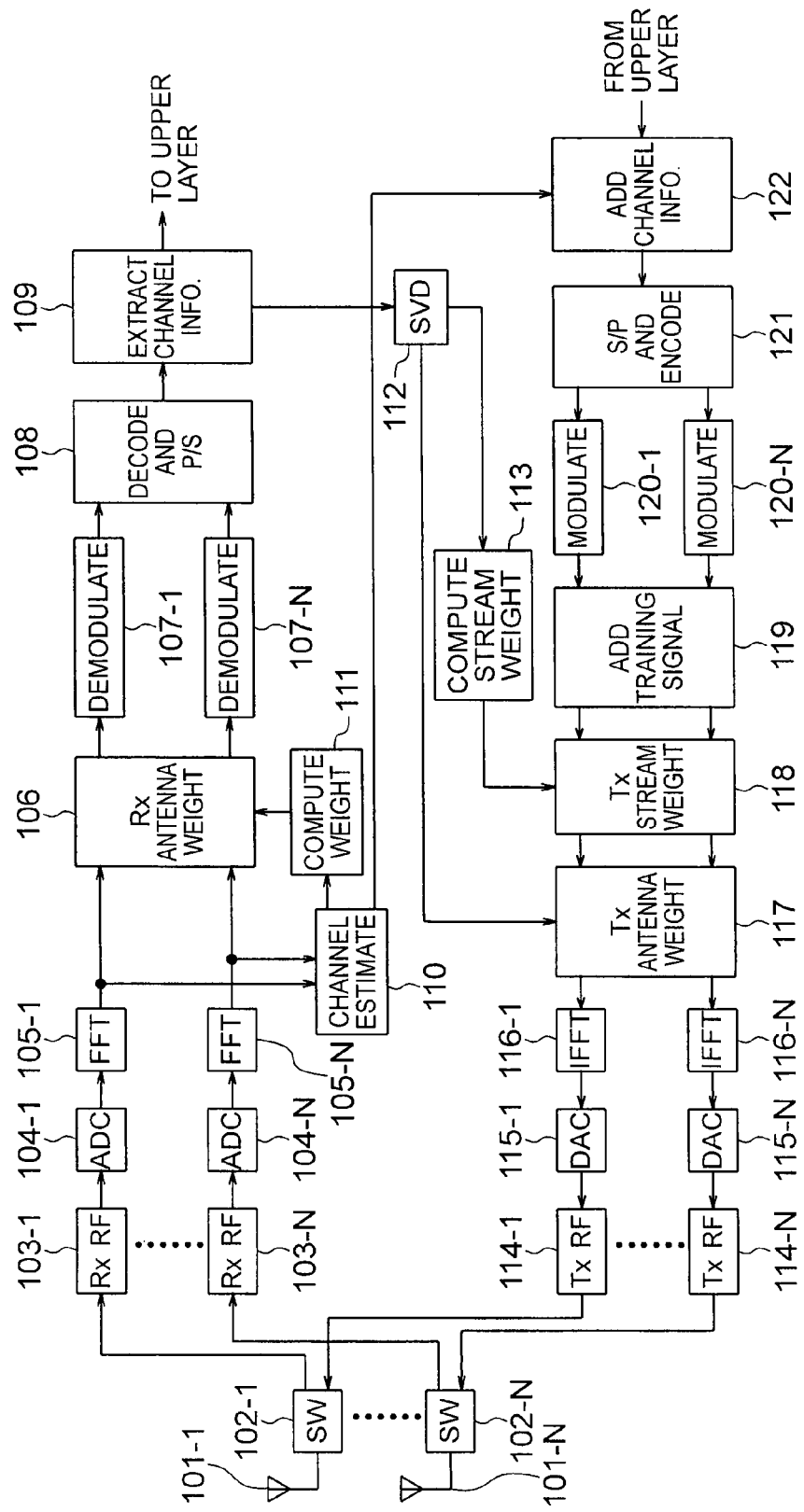
FIG. 9 is a functional block diagram of a wireless communication apparatus of the present invention.

FIG. 9 is a functional block diagram of a wireless communication apparatus for communications by the MIMO wireless communication method of the present invention, according to the third embodiment.

The wireless communication apparatus shown in FIG. 9 has N antennas 101-1 to 101-N and are connected to switches 102-1 to 102-N, respectively. The switch 102 interconnects a transmission circuit and an antenna for transmission by the wireless communication apparatus, and interconnects a reception circuit and the antenna for reception by the wireless communication apparatus. The switch 102 is required in a system adopting a time division duplex (TDD) method often used by wireless LAN, and is equipped with a filter called a duplexer in a system adopting a frequency division duplex (FDD) method often used by mobile phones.

For reception, the switch 102 interconnects the antenna 101 and a reception analog RF circuit 103. The reception analog RF circuit performs down-conversion to convert a reception signal into a baseband analog signal. An output of the reception analog RF circuit is supplied to an AD converter 104 which converts the baseband analog signal into a digital signal. An output of the AD converter 104 is supplied to a FFT processing unit 105. The FFT processing unit 105 composes the reception signal into subcarriers of OFDM. Since wireless LAN adopts OFDM, the FFT processing unit 105 is necessary. However, the FFT processing unit 105 is not necessary for a communication method using single carrier transmission. An output of the FFT processing unit 105 is branched to two signals. One signal is supplied to a channel matrix estimating unit 110 which estimates the channel matrix when a training signal is received. An output of the channel matrix estimating unit is connected to two blocks. One block is a reception antenna weight calculating unit 111 which calculates a reception antenna weight from the estimated channel matrix by the zero forcing method, MMSE method or MLD method. The other output of the branched outputs of the FFT processing unit 105 and an output of the reception antennal weigh processing unit 111 are input to a reception antenna weight processing unit 106 which recovers the reception data signal by using the reception antenna weight calculated by the reception antenna weight calculating unit 111, when reception data signal recovery is necessary. The recovered data signal is input to a demodulator 107 which converts the recovered data signal into bit data. An output of the demodulator 107 is input to an error correction decoding and parallel/serial converter 108 to perform error correction decoding and parallel/serial conversion. An output of the error correction decoding and parallel/serial converter 108 is input to a channel information extracting unit 109 which, if the reception data is the channel matrix and communication quality information on a communication partner, extracts these pieces of information. If the reception data is other information, the information is passed to the upper layer. The channel matrix extracted by the channel information extracting unit 109 is input to a singular value decomposition processing unit 112 to perform singular value decomposition. A transmission antenna weight determined by this unit 112 is passed to a transmission antenna weight processing unit 117. The singular values are input to a transmission stream weight calculating unit 113. The transmission stream weight calculating unit 113 evaluates a communication quality indicator of each eigenmode by using the singular values to determine a transmission stream weight. The determined transmission stream weight is input to a transmission stream weight processing unit 118.

Communication data is passed from the upper layer to a channel information adding unit 122. An output of the branched outputs of the channel matrix estimating unit 110 is also input to the channel information adding unit 122, and if the channel matrix to be transmitted exists, the channel matrix is transmitted before communication data. An output of the channel information adding unit 122 is input to a serial/parallel conversion and error correction encoding unit 121 to perform serial/parallel conversion and error correction encoding. An output of the serial/parallel conversion and error correction encoding unit 121 is modulated by a modulator 120 and thereafter input to a training signal adding unit 119 which adds the training signal if necessary and transmits it. An output of the training signal adding unit 119 is processed by a transmission stream weight processing unit 118 and a transmission antenna weight processing unit 117. Since the processes at the transmission stream weight processing unit 118 and transmission antenna weight processing unit 117 are both the matrix calculation, one transmission weight process is sufficient if the transmission stream weight and transmission antenna weight are synthesized beforehand by a matrix product. An output of the transmission antenna weight processing unit 117 is converted by an IFFT processing unit 116 from an OFDM subcarrier signal into a time domain signal. Similar to the FFT processing unit 105, the IFFT processing unit 116 is unnecessary for the communication method using single carrier transmission. An output of the IFFT processing unit 116 is converted into an analog signal by a DA converter 115, and thereafter a transmission analog RF circuit 114 performs up-conversion and is connected to the switch 102. For signal transmission, the switch 102 interconnects the antenna 101 and transmission RF circuit 114.

Description will now be made on the operation of the wireless communication apparatus shown in FIG. 9 with reference to the wireless communication procedure shown in FIG. 1. Both the transmission and reception terminals have the structure of the wireless communication apparatus shown in FIG. 9. When training data is transmitted from the transmission terminal, the training signal adding unit 119 adds a training signal for transmission. In this case, the transmission antenna weight processing unit 117 and transmission stream weight processing unit 118 do not perform the weight process. Next, the reception terminal receives the training signal. At this time, the channel matrix estimating unit 110 estimates the channel matrix, adds the channel information estimated at the channel information adding unit 122, and returns the channel information to the transmission terminal. The transmission terminal receives the channel information, the channel information extracting unit 109 extracts the channel matrix, and the singular value decomposition processing unit 112 performs singular value decomposition. In accordance with a result of singular value decomposition, a transmission antenna weight is sent to the transmission antenna weight processing unit 117. By using the singular value, the transmission stream weight calculating unit 113 calculates a transmission stream weight and sends it to the transmission stream weight processing unit 118. Thereafter, the training signal adding unit 119 adds the training signal for transmission toward the reception terminal. In this case, processing is made by the transmission antenna weight processing unit 117 and transmission stream weight processing unit 118, by using the set transmission weight. The reception terminal receives the training signal, and the channel matrix estimating unit 110 estimates the channel matrix. By using the estimated channel matrix, the reception antenna calculating unit 111 calculates the reception antenna weight and sets it to the reception antenna weight processing unit 106. Thereafter, the transmission terminal performs the transmission weight process so that a transmission data signal can be transmitted, and the reception terminal can recover the data signal by using the reception antenna weight, to thus establish communications.

As described above, with the operation of the wireless communication apparatus shown in FIG. 9, a large communication capacity can be realized without increasing the number of levels of modulation, even in a high SNR communication environment.

Fourth Embodiment

Figure 10:
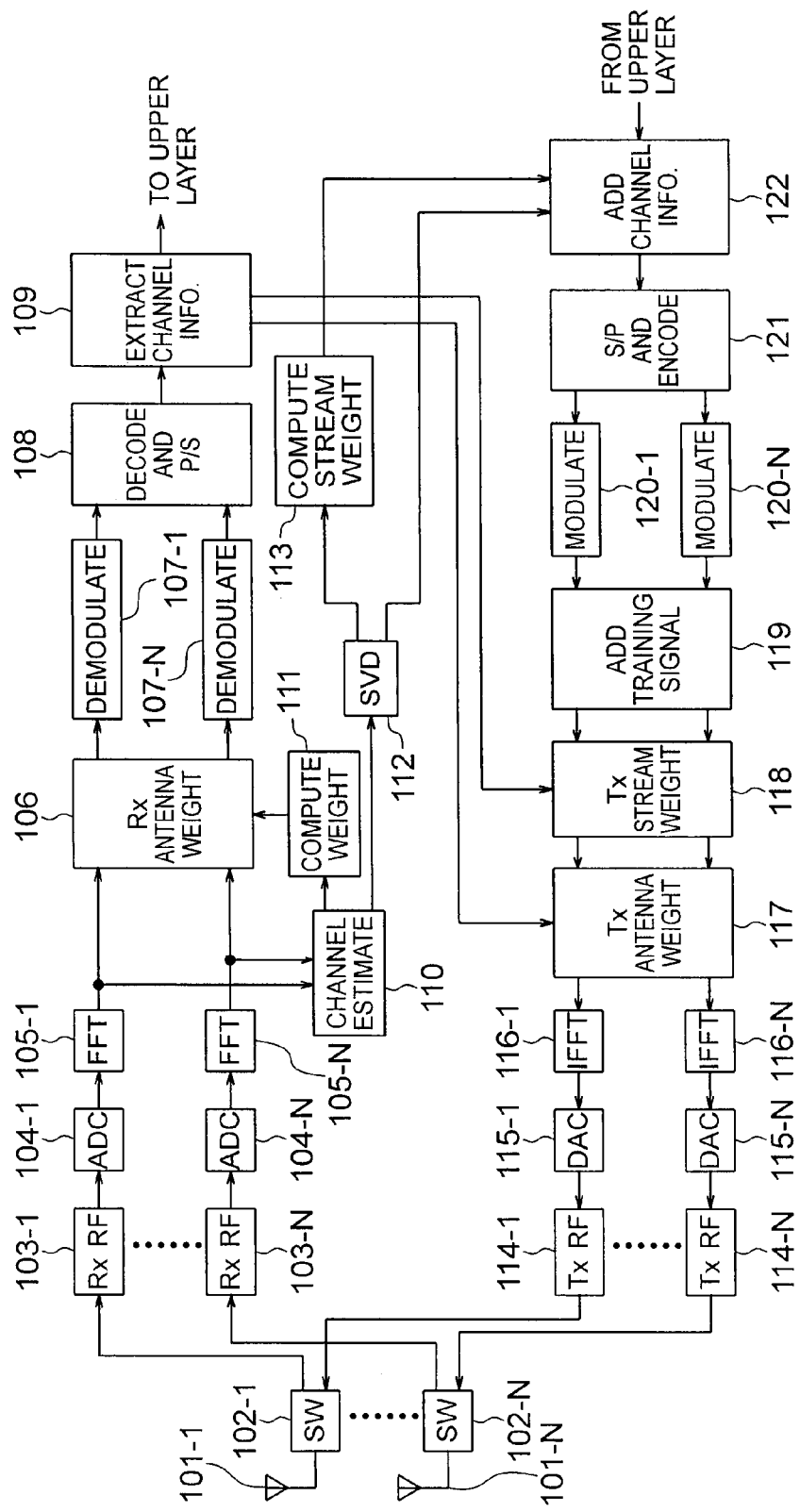
FIG. 10 is a functional block diagram of a wireless communication apparatus of the present invention.

FIG. 10 is a functional block diagram of a wireless communication apparatus for communications by the MIMO wireless communication method of the present invention, according to the fourth embodiment.

Most of the structures of the wireless communication apparatus shown in FIG. 10 are the same as those of the wireless communication apparatus shown in FIG. 9. A different point from FIG. 9 resides in the positions of the singular value decomposition processing unit 112 and transmission stream weight calculating unit 113. With this arrangement, singular value decomposition and transmission stream weight calculation are performed at the reception terminal.

The channel matrix estimated by the channel matrix estimating unit 110 is input to the reception antenna weight calculating unit 111 and singular value decomposition processing unit 112. A transmission antenna weight obtained by the singular value decomposition processing unit 112 is passed to the channel information adding unit 122. Singular values are input to the transmission stream weight calculating unit 117 which determines the transmission stream weight and passes it to the channel information adding unit 122. Although the channel information adding unit 122 has a function of returning the transmission weight to the transmission terminal, the transmission stream weight and transmission antenna weight can be synthesized by a matrix product. Therefore, a synthesized transmission weight is returned in order to reduce the amount of information to be returned.

When the transmission weight is returned, the channel information extracting unit 109 extracts the transmission antenna weight and transmission stream weight, and sets the weights to the transmission antenna weight processing unit 117 and transmission stream weight processing unit 118, respectively. However, as described above, if the transmission weight synthesizing the transmission antenna weight and transmission stream weight by a matrix product is to be returned, one processing unit is sufficient for executing the transmission weight process by using the synthesized transmission weight.

Description will now be made on the operation of the wireless communication apparatus shown in FIG. 10 with reference to the wireless communication procedure shown in FIG. 5. Both the transmission and reception terminals have the structure of the wireless communication apparatus shown in FIG. 10. When training data is to be transmitted from the transmission terminal, the training signal adding unit 119 adds a training signal for transmission. In this case, the transmission antenna weight processing unit 117 and transmission stream weight processing unit 118 do not perform the weight process. Next, the reception terminal receives the training signal. At this time, the channel matrix estimating unit 110 estimates the channel matrix, and the singular value decomposition processing unit 112 performs singular value decomposition. In accordance with a result of singular value decomposition, a transmission antenna weight is sent to the channel information adding unit 122. By using the singular values, the transmission stream weight calculating unit 113 evaluates the communication quality indicator of each eigenmode, calculates a transmission stream weight and sends it to the channel information adding unit 122. The channel information adding unit 122 adds transmission weight data to return it to the transmission terminal. The transmission terminal receives the transmission weight data, and the channel information extracting unit 109 extracts the transmission weight and sets it to the transmission antenna weight processing unit 117 and transmission stream weight calculating unit 113. Thereafter, the training signal adding unit 119 adds a training signal and transmits it toward the reception terminal. In this case, processing is made by the transmission antenna weight processing unit 117 and transmission stream weight processing unit 118, by using the set transmission weights. The reception terminal receives the training signal, and the channel matrix estimating unit 110 estimates the channel matrix. In accordance with the estimated matrix, the reception antenna weight calculating unit 111 calculates the reception antenna weight and sets it to the reception antenna weight processing unit 106. Thereafter, the transmission terminal performs the transmission weight process so that a transmission data signal can be transmitted. The reception terminal can recover the data signal by using the reception antenna weight, to thus establish communications.

As described above, with the operation of the wireless communication apparatus shown in FIG. 10, a large communication capacity can be realized without increasing the number of levels of modulation, even in a high SNR communication environment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multiple-input multiple-output (MIMO) wireless communication method for communications between a transmission station having a plurality of antennas and a reception station having a plurality of antennas, the method comprising:
   a first step of obtaining a channel matrix of transmission paths between said transmission station and said reception station in accordance with a reception state of a training signal transmitted from said transmission station and received at said reception station, and forming a plurality of eigenmodes of said transmission paths through singular value decomposition of said channel matrix; and a second step of synthesizing at least a fraction of said plurality of eigenmodes for performing data communications from said transmission station to said reception station.

2. The MIMO wireless communication method according to claim 1, wherein said second step synthesizes eigenmodes in the order of a larger singular value.

3. The MIMO wireless communication method according to claim 2, wherein said second step adaptively controls the number of levels of modulation and an error-correcting code coding rate of each eigenmode in accordance with a communication quality of each eigenmode after synthesis of the eigenmodes.

4. The MIMO wireless communication method according to claim 1, further comprising a third step of evaluating a communication quality indicator of each of said eigenmodes, wherein said second step synthesizes one or more eigenmodes having said communication quality indicator larger than a preset reference value, among said eigenmodes, and the eigenmode having a largest communication quality indicator among eigenmodes having the communication indicator smaller than the preset reference value.

5. The MIMO wireless communication method according to claim 4, wherein an effective signal-to-noise ratio (SNR) of each eigenmode is used as said communication quality indicator.

6. The MIMO wireless communication method according to claim 5, wherein said second step adaptively controls the number of levels of modulation and an error-correcting code coding level of each eigenmode in accordance with a communication quality of each eigenmode after synthesis of the eigenmodes.

7. The MIMO wireless communication method according to claim 1, wherein said second step adaptively controls the number of levels of modulation and an error-correcting code coding rate of each eigenmode in accordance with a communication quality of each eigenmode after synthesis of the eigenmodes.

8. The MIMO wireless communication method according to claim 4, wherein said second step adaptively controls the number of levels of modulation an error-correcting code coding rate of each eigenmode in accordance with a communication quality of each eigenmode after synthesis of the eigenmodes.

9. A transmission station in a multiple-input multiple-output (MIMO) wireless communication system for communications between said transmission station having a plurality of antennas and a reception station having a plurality of antennas, the transmission station comprising:

a stream weight processing unit for adopting a stream weight, synthesizing at least a fraction of a plurality of eigenmodes generated by using a training signal to be transmitted from said transmission station, to a transmission signal; and a wireless communication unit for transmitting said transmission signal adopting said stream weight.

10. The transmission station according to claim 9, wherein said stream weight processing unit uses said stream weight synthesizing eigenmodes in the order of a larger singular value.

11. The transmission station according to claim 9, wherein said stream weight processing unit uses said stream weight synthesizing one or more eigenmodes having a communication quality indicator larger than a preset reference value, among said eigenmodes, and the eigenmode having a largest communication quality indicator among eigenmodes having said communication quality indicator smaller than the preset reference value.

12. The transmission station according to claim 11, wherein an effective signal-to-noise ratio (SNR) of each eigenmode is used as said communication quality indicator.

13. The transmission station according claim 12, wherein said stream weight processing unit includes means for adaptively controlling the number of levels of modulation of each eigenmode and means for changing an error-correcting code coding rate, in accordance with a communication quality of each eigenmode after synthesis of the eigenmodes.

14. The transmission station according claim 9, wherein said stream weight processing unit includes means for adaptively controlling the number of levels of modulation of each eigenmode and means for changing an error-correcting code coding rate, in accordance with a communication quality of each eigenmode after synthesis of the eigenmodes.

15. The transmission station according claim 10, wherein said stream weight processing unit includes means for adaptively controlling the number of levels of modulation of each eigenmode and means for changing an error-correcting code coding rate, in accordance with a communication quality of each eigenmode after synthesis of the eigenmodes.

16. The transmission station according claim 11, wherein said stream weight processing unit includes means for adaptively controlling the number of levels of each eigenmode and means for changing an error-correcting code coding rate, in accordance with a communication quality of each eigenmode after synthesis of the eigenmodes.

17. A reception station in a multiple-input multiple-output (MIMO) wireless communication system for communications between a transmission station having a plurality of antennas and said reception station having a plurality of antennas, the reception station comprising:

a channel matrix estimating unit for estimating a channel matrix of transmission paths from said transmission station by receiving a training signal transmitted from said transmission station;

a stream weight calculating unit for calculating a stream weight synthesizing at least a fraction of a plurality of eigenmodes of said transmission paths obtained by said channel matrix; and a transmitting unit for transmitting information on said stream weight to said transmission station, wherein said stream weight calculating unit is used for eigenmode transmission from said transmission station.

18. The reception station according to claim 17, wherein said stream weight calculating unit synthesizes eigenmodes in the order of a larger singular value.

19. The reception station according to claim 17, wherein said stream weight calculating unit synthesizes one or more eigenmodes having a communication quality indicator larger than a preset reference value, among said eigenmodes, and the eigenmode having a largest communication quality indicator among eigenmodes having said communication quality indicator smaller than the preset reference value.

20. The reception station according to claim 19, wherein an effective signal-to-noise ratio (SNR) of each eigenmode is used as said communication quality indicator.

* * * * *